Figure 1:
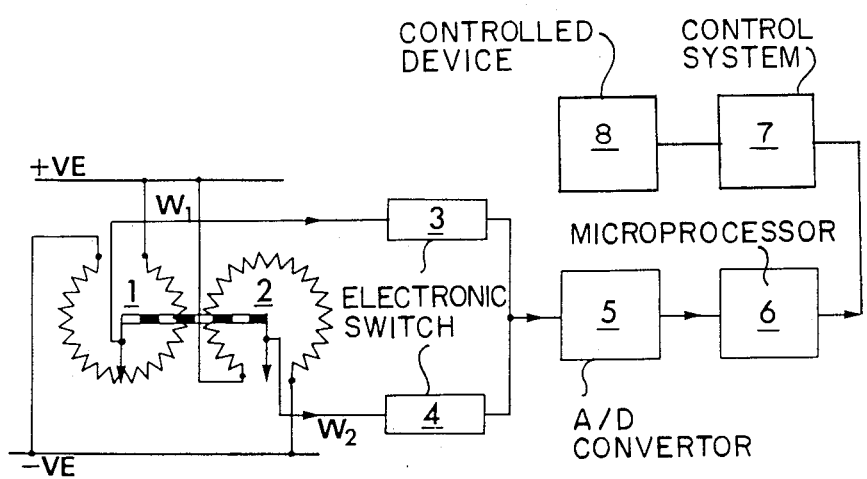

United States Patent [19]

Hawkins et al.

[11] Patent Number: 4,716,518
[45] Date of Patent: Dec. 29, 1987

[54] INCREMENTAL CONTROL

[75] Inventors: Nicholas J. Hawkins, Cambridgeshire; Robert Saltarelli, Suffolk, both of England

[73] Assignee: W. Vinten Limited, Suffolk, England

[21] Appl. No.: 798,065

[22] Filed: Nov. 14, 1985

[30] Foreign Application Priority Data

Nov. 14, 1984 [GB] United Kingdom ................. 8428806

[51] Int. Cl.$^4$ .............................................. G05D 3/00
[52] U.S. Cl. .................................... 364/184; 338/132; 338/173; 338/191
[58] Field of Search ....................... 364/184; 323/364; 338/130–133, 172, 173, 191, 201

[56] References Cited

U.S. PATENT DOCUMENTS 3,916,369 10/1975 Minami ............................ 338/172

FOREIGN PATENT DOCUMENTS 1352786 5/1974 United Kingdom .
1490083 10/1977 United Kingdom .

Primary Examiner—Jerry Smith
Assistant Examiner—Allen MacDonald
Attorney, Agent, or Firm—Larson and Taylor

[57] ABSTRACT

An endstopless incremental control provided by parallely connecting and ganging at least two potentiometer wipers without mechanical endstops, selectively switching, converting and sampling the individual output on the potentiometer wipers and utilizing only the valid outputs for feeding to a control system.

16 Claims, 2 Drawing Figures

INCREMENTAL CONTROL

This invention relates to incremental control and more particularly, though not exclusively to non-endstop incremental control.

Incremental control has been used in a variety of situations for a number of years. Such controls have been applied to rotation, especially where it is necessary to precisely position a rotating platform or the like. One such method of rotational control is a resolver wherein an electrically excited rotor is positioned in stator windings and the components along the axes of the stator windings are transmitted electrically to the stator of a synchro motor where they are combined to form a vector composed of a magnetic field of a given strength in a given direction. A rotor in the magnetic field picks up the voltage proportional to the magnitude of the error and this voltage may be used to drive a servo motor until the error signal is zero, i.e. both rotors are aligned and equipment required to be rotated by the servo motor to the selected position of the transmitter rotor would also be aligned therewith. This method, though effective, is expensive.

A further well known method is with the use of an optical encoder wherein, for example, light transmitted through apertures in a wheel energizes electronic devices which determine the angular rotation of a drive motor to re-position a piece of rotatable equipment. Though this method of control is cheaper its physical size in relation to accuracy is much greater and this often presents a problem.

One of the basic objects of incremental control of rotatable equipment is that control shall be provided over the full 360° so the use of a simple potentiometer is precluded as it, by definition, has a wiper for picking off various values of resistance or voltage and has states where there is either maximum resistance or no resistance, it also has an electrical deadband. In some types of potentiometers even mechanical end stops are provided to stop the wiper from losing contact with the resistor, other types have only an insulated strip between the two ends of the resistor so that the wiper may rotate continuously in either direction but will not be in electrical contact at all times. To overcome this problem and provide a variable resistance which, in use, provides resistance at all times multi-turn potentiometers have been used with only a small section of the resistance winding e.g. one complete turn of the potentiometer, being used. These potentiometers are of no use in our application where continuous 360° of rotation from any starting point is required.

It is therefore an object of this invention to provide a relatively cheap means of incremental control, using potentiometers, over a full 360° of movement.

According to the invention we provide an endstopless incremental control comprising at least two ganged variable output means parallely connected across a voltage supply having their outputs each connected via a serially connected selector switching and conversion means to provide a digital output for feeding to a processing means for determining an increment, said processing means during scanning of said digital outputs determining which variable output means is producing the valid increment and using said valid increment in a control system.

Figure 2:
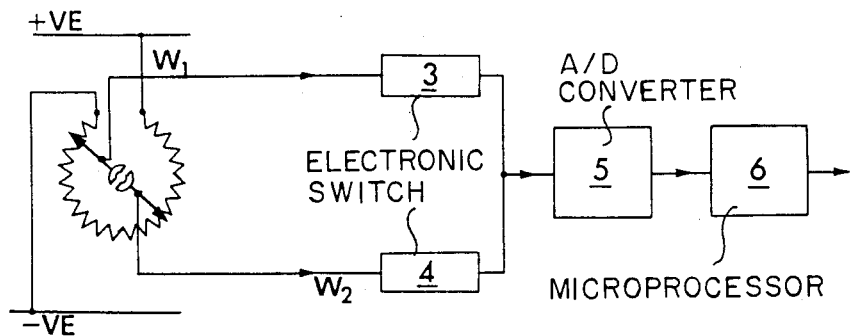

The invention will now be described, by way of example only in conjunction with the accompanying diagrams in which FIG. 1 shows a theoretical circuit according to the invention and FIG. 2 shows an alternative ganged variable output means.

Referring now to FIG. 1 two potentiometers (1) and (2) without mechanical endstops, are connected in parallel across positive and negative rails and are ganged when their conductive tracks are 180 degrees out of phase with each other but their wipers are in alignment. A single potentiometer conductive track as shown in FIG. 2 wherein the two wipers are electrically isolated from, and 180 degrees out of phase with, each other may equally well be used. Wiper $W_1$ provides an output which is fed to an electronic switching means (3) and wiper $W_2$ provides an output which is fed to an electronic switching means (4). The two out of phase electronic switching means which may conveniently be channels of a multiplexer, so operating so that switch (3) and witch (4) are not both conducting at the same time and the inputs from wipers $W_1$ and $W_2$ are fed independently to an analog to digital converter (5) which provides digital outputs related to the selected position of the ganged potentiometers. These digital outputs are fed on demand, to a microprocessor or the like (6). The microprocessor (6) determines a goodness factor 'G', which in this case is an assessment of reliability of voltages $W_1$ and $W_2$, i.e. if a series of $W_1$ readings showed center potentiometer positioning and a series of $W_2$ readings showed end of potentiometer readings then the goodness factor 'G' would be $G_1$ greater than $G_2$ and the readings of wiper $W_1$ would be used. Using the output with the preferred goodness factor and assuming that the current values of $W_1$ and $W_2$ outputs at any instant are $W_1t$ and $W_2t$ and that the previous stored values of $W_1$ and $W_2$ outputs at any instant are $W_1t$ and $W_2t$ and that the previous stored values of $W_1$ and $W_2$ are $W_1t-1$ and $W_2t-1$ then the increment or decrement of the preferred $W_1$ or $W_2$ as decided by the goodness factor 'G' is processed within the microprocessor discarding the invalid inputs in favor of the valid inputs and uses only the valid inputs for feeding out to any type of control system. A control system (7) is indicated in FIG. 1 which may be controlling the positioning of a controlled device (8) such as a rotatable platform or the like by such as motor driven means. By this method of control the deadband caused by the wiper at the extremity of the resistor winding is eliminated. The output of the microprocessor may be fed via a digital to analog converter dependent on the type of controller in use.

It is to be understood that the control system (7) need not necessarily be for a motor and could readily be used on data recovery for onscreen display by controlling such as a cursor on such as a storage scope or may be used for scrolling screens of data.

It is also to be understood that though electronic switching has been described electrical switching means, such as relays or the like, may equally well be used especially for slow speed operations.

I claim as my invention:

1. An endstopless incremental control arrangement comprising:
   at least two variable output devices connected in parallel across a voltage supply, said variable output devices each including an output member which is variable in position to vary the output of the associated device;

means for ganging said output members together so that there is a predetermined relationship between the positions of the output members relative to the corresponding variable output devices;

a selector switching means connected in series with the output member of each of said variable output devices;

conversion means connected to the outputs of said switching means for providing a digital output in accordance with the outputs for said switching means; and processing means, connected to said conversion means, for processing said digital output so as to determine which of the variable output devices is producing the most valid output and for producing an output signal corresponding to the said most valid output for use in a control system.

2. An endstopless incremental control arrangement as claimed in claim 1 wherein said at least two variable output devices each comprises a potentiometer.

3. An arrangement as claimed in claim 1 wherein said at least two output devices comprise first and second potentiometers having conductive tracks connected 180° out of phase and said output members comprise potentiometer wipers for said first and second potentiometers which are ganged in alignment.

4. An endstopless incremental control arrangement as claimed in claim 1 wherein said conversion means comprises an analog to digital converter.

5. An endstopless incremental control arrangement as claimed in claim 1 wherein said processing means comprises a microprocessor.

6. An endstopless incremental control as claimed in claim 1 wherein said selector switching means comprise electronic switches.

7. An endstopless incremental control arrangement as claimed in claim 1 wherein said selector switching means comprise channels of a multiplexer.

8. An endstopless incremental control arrangement as claimed in claim 1 wherein said selector switching means comprise relays.

9. An endstopless incremental control arrangement comprising:

a variable output device connected across a voltage supply, said variable output device including at least two output members which are variable in position to provide different outputs in accordance wtih the respective positions of the respective output members;

means for ganging said output members together so that there is a predetermined relationship between the positions of the output members relative to the variable output device;

a selector switching means connected in series with each of the output members of said variable output device;

conversion means connected to the outputs of said selector switching means for producing a corresponding digital output; and processing means, connected to said conversion means, for processing said digital output so as to determine which said variable output members is producing the most valid output and for producing an output signal corresponding to the said most valid output for use in a control system.

10. An arrangement as claimed in claim 9 wherein said output device comprises a potentiometer and said output members comprise first and second potentiometer wipers for said potentiometer which are electrically isolated from each other and which are ganged together so that the wipers are 180° out of phase.

11. An arrangement as claimed in claim 9 wherein said variable output device comprises a potentiometer.

12. An arrangement as claimed in claim 9 wherein said conversion means comprises an analog to digital converter.

13. An arrangement as claimed in claim 9 wherein said processing means comprises a microprocessor.

14. An arrangement as claimed in claim 9 wherein said selector switching means each comprise an electronic switch.

15. An arrrangement as claimed in claim 9 wherein said selector switching means each comprise a channel of a multiplexer.

16. An arrangement as claimed in claim 9 wherein said selector switching means each comprise a relay.

* * * * *